FIP8102 XR 3,426,278
CROSS REFERENCE SEARCH ROOM
Feb. 4, 1969 K. VAN DER VALK 3,426,278
COMMUNICATION SYSTEM WITH SYNCHRONOUS COMMUNICATION BETWEEN STATIONS VIA REPEATER
Filed April 1, 1966
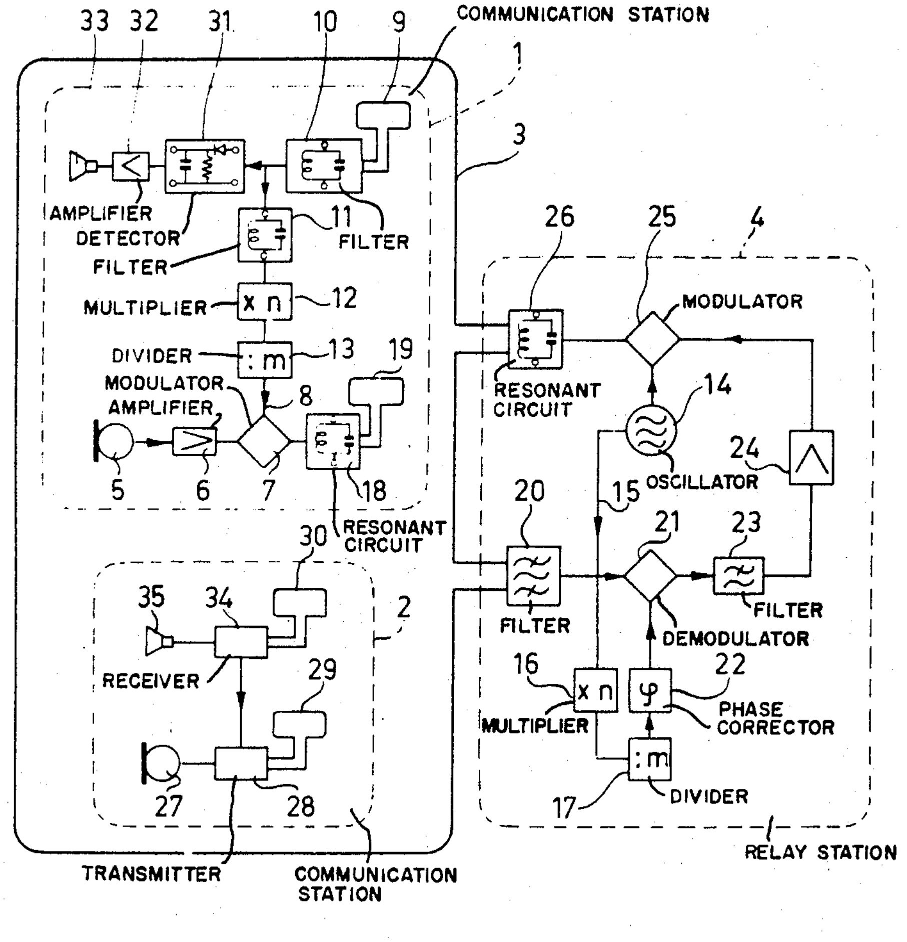
INVENTOR.
KEES VAN DER VALK
BY
AGENT United States Patent Office 3,426,278

Patented Feb. 4, 1969

3,426,278

COMMUNICATION SYSTEM WITH SYNCHRONOUS COMMUNICATION BETWEEN STATIONS VIA REPEATER

Kees van der Valk, Emmasingel, Eindhoven, Netherlands, assignor to North American Philips Company, Inc., New York, N.Y., a corporation of Delaware Filed Apr. 1, 1966, Ser. No. 539,566
Claims priority, application Netherlands, Apr. 8, 1965, 6504462
U.S. Cl. 325—10 6 Claims
Int. Cl. H04b *7/14*

ABSTRACT OF THE DISCLOSURE

A communication system has a plurality of communication stations each adapted to transmit suppressed carrier signals at a first frequency and the receive signals at a second frequency. The carrier signals for modulation are derived from the carrier of the received signals. A relay station is provided that includes a source of oscillations of the first and second frequencies, which have a predetermined ratio. The relay station receives and synchronously demodulates the suppressed carrier signals, and remodulates the demodulated signals on the second carrier frequency for transmission without suppressed carrier.

The invention relates to a communication system comprising several communication stations which are each provided with a transmitting and a receiving device.

Such communication systems are used inter alia in factory and office rooms for the communication between persons in different parts of these rooms.

The invention has for its object to provide a communication system of the aforementioned kind in which with extremely simple and uniform low-power transmission apparatus a very reliable speech transmission in duplex traffic between the communication stations is achieved.

A communication system in accordance with the invention is characterized in that in the communication stations, the signals to be transmitted are supplied to suppressed-carrier amplitude modulators driven by relatively synchronized carrier waves of equal frequencies, and in that provision is made of an amplifier station connected to a loop, which amplifier station includes a synchronous demodulator for recovering the signals and an amplitude modulator with an associated carrier wave oscillator for re-transmitting the recovered signals.

The invention and its advantages will now be described more fully with reference to an embodiment shown in the drawing.

The communication system shown in the drawing serves for the speech transmission in duplex traffic between several communication stations over distances which are small with respect to the wave length of the carrier waves used for the signal transmission. By way of example, the drawing shows two of these communication stations which are denoted by the reference numerals 1 and 2. The communication system further includes a loop conductor 3 and a receiving and transmitting device 4 connected to the ring conductor which is referred to hereinafter as relay station and which is common to all communication stations.

A duplex link between two communication stations extends through the loop conductor and the relay station which operates in this link both as an intermediate amplifier and as a frequency convertor. For the signal transmission, use is made of carrier waves having wave lengths which are great with respect to the dimensions of the loop conductor, for example, of carrier waves in a frequency range from 40 kc./s. to 135 kc./s. The signal transmission between the loop conductor and the communication stations is carried out inductively.

In the explanation of the operation of the communication system and its advantages, it is assumed that the communication station 1 is in connection with the communication station 2 and that two persons carry on a conversation via these communication stations. Communication station 1 includes a microphone 5 the output signals of which are supplied, after being amplified by an audio-amplifier 6, to an amplitude modulator 7. This modulator is driven by a carrier wave signal supplied to a supply lead 8. For the explanation of the manner in which this carrier wave signal is produced, it is required to consider first the signal transmission from the relay station to the communication station. This signal transmission is effected by double sideband amplitude modulation with carrier wave. This amplitude modulation signal is captured by a receiver loop 9 which has the form, for example, of a coil wound on a ferrite rod and a subsequent filter 10, for example, in the form of a resonant circuit tuned to the carrier frequency. The output of filter 10 has connected to it a carrier wave filter 11 of small band-width which selects the carrier wave and supplies it to a frequency multiplier 12 and a subsequent frequency divider 13. It has been found in practice that the carrier wave filter 11 can be omitted, the required selectivity then being supplied entirely by the frequency multiplier and the frequency divider. The output signal of frequency divider 13 has a frequency which is $n/m$ times the carrier frequency of the relay station. This output signal which is supplied to the supply lead 8 of the amplitude modulator 7 acts for this modulator as a carrier wave signal. In the relay station 4, the carrier wave is supplied by a carrier wave oscillator 14. A carrier wave signal is derived from this oscillator through a conductor 15, which signal is supplied in the same manner as in the communication station 1 to a frequency multiplier 16 and a subsequent frequency divider 17. The frequency of the output signal of frequency divider 17 is $n/m$ times the frequency of carrier wave oscillator 14 and is therefore exactly equal to the carrier frequency of communication station 1. It is thus rendered possible to use for the signal transmission from the communication stations to the relay station suppressed-carrier amplitude modulation and carrier waves of equal frequencies. As a result of this equality of the carrier frequencies of the communication stations, each duplex link requires only two different carrier frequencies and each communication station can operate both as calling station and as called station without being changed over. The frequency division factor $m$ is chosen to be $m=2$. Owing to the small relative distances with respect to the wave length, a phase relation exists between the local carrier wave in the relay station on the one hand and the (suppressed) carrier waves of the communication stations on the other hand, which is suitable for the synchronous demodulation of a double sideband amplitude modulation signal with suppressed carrier wave. Amplitude modulator 7 is a modulator of a balanced type. The output signal thereof is a suppressed-carrier double sideband amplitude modulation signal. This output signal is supplied through a resonant circuit 18 included in the output circuit of the modulator to a transmitter loop 19, for example, in the form of a coil wound on a ferrite rod which transmits the signal by inductive agency to the loop conductor 3. The use of suppressed-carrier double sideband amplitude modulation affords the advantage that the use of complicated filters can be avoided. This is of particular importance for communication stations of the type described when they include several duplex links at different frequencies. Owing to the absence of complicated filters, a communication station can then be tuned by very simple means to another carrier frequency.

The signal captured by loop conductor 3 is supplied to relay station 4. In this station, these signals are selected by a bandpass filter 20 which supplies the selected signal to the input of a synchronous demodulator 21. The output signal of frequency divider 17 is supplied, as the case may be after a phase correction by a phase-correction network 22, to a second input of the synchronous demodulator 21 for the synchronous demodulation of the suppressed-carrier double sideband amplitude modulation signal supplied to the first input. The audiofrequency output signal of the synchronous demodulator 21 is then supplied through a low bandpass filter 23 and a subsequent audio-amplifier 24 to an amplitude modulator 25 driven by the carrier wave oscillator 14. The output signal of amplitude modulator 25 is a double sideband amplitude modulation signal having a high signal level. This signal is supplied through a resonant circuit 26 included in the output of the amplitude modulator to loop conductor 3.

In the communication station 2, the output signal of the microphone 27 is converted by a transmitting device 28 into a suppressed-carrier double sideband amplitude modulation signal in quite the same manner as in the communication station 1. This signal is supplied to a transmitter loop 29 which transmits the signal inductively to the loop conductor 3. Owing to the interruption of the carrier waves in the signals transmitted by the two communication stations to the loop conductor 3 only a signal of the communication station in which speech sounds are produced is operative in the loop conductor 3 so that the signal transmission from this communication station is prevented from being disturbed by the other station if no speech sounds are produced therein. The signal originating from communication station 2 then passes the relay station 4 in quite the same manner as the signal originating from communication station 1.

The signal supplied by relay station 4 to loop conductor 3 is transmitted by this conductor inductively to the receiver loops 9 and 30 of communication stations 1 and 2, respectively. The signal captured by receiver loop 9 is supplied through filter 10 and, as the case may be, after amplification to an envelope detector 31. The audiofrequency output signal of envelope detector 31 is then supplied, after being amplified by an audio-amplifier 32, to a loud-speaker or telephone 33. In quite the same manner, the signal captured by the receiver loop 30 of communication station 2 is converted by a receiving device 34 into an audiofrequency signal which is supplied to a loudspeaker or telephone 35. In this manner, the speech of the speaking person is reproduced both in the receiving and in the transmitting communication station. This brings about a local effect controlling the loudness of the speech.

So far the case has been considered in which two stations communicate with each other via a duplex link. The number of communication stations taking part in a duplex link can be enlarged, however, according to desire, for example for conference purposes, a duplex link being established, in fact, between each two communication stations.

As stated above, the carrier frequency of the communication stations is $n/m$ times that of the relay station, in which case $m$ is chosen to be $m=2$. The lowest value suitable for $n$ is $n=2$. For $n=1$, the receiving frequency of a communication station is just the second harmonic of the transmitting frequency, which in case of a not fully balanced modulator would give rise to an undesired influence of the transmitter end on the receiver end. As a matter of course, the value $n=2$ cannot be used, while for $n=4$ the receiver end of the relay station is adversely affected by the second harmonic of the transmitter signal. In order to avoid adverse effects by harmonics, $n$ is generally chosen to be an odd number greater than one and preferably $n=3$.

In the communication system so far described, only one duplex link can exist at any given instant between two or more communication stations. This duplex link requires a pair of carrier frequencies between which exists the relation described hereinbefore. When several relay stations of the type described are provided, several independent duplex connections can be established through which several independent conversations may be carried on. The various pairs of frequencies should be chosen so that the various duplex connections influence each other to the least possible extent. In the aforementioned frequency range, for example, the following pairs of frequencies are suitable to be used simultaneously in one communication station: 66 kc./s. and 99 kc./s.; 74 kc./s. and 111 kc./s.; 82 kc./s. and 123 kc./s., the lower frequency of each pair each time indicating the carrier frequency of the associated relay station. The communication stations are preferably constructed so as to be commutatable so that they can use each of the possible duplex connections. As already state, the suppressed-carrier double sideband modulation used is of advantage, since change-over to another carrier frequency can be achieved by very simple means.

The communication system described above can be improved in a simple manner by the use of a single sideband filter in the amplifier station. This single sideband filter, which replaces the bandpass filter 20, is proportioned so that it selects one of the two sidebands of the received double sideband amplitude modulation signal and rejects the other. The synchronous demodulator 21 then receives a single sideband signal which is demodulated in the usual manner. The phase of the local carrier wave supplied to the synchronous demodulator 21 does not influence the loudness and the distortion of the modulated signal and can consequently be chosen arbitrarily. The phase of the local carrier wave does not impose limitations on the spatial dimensions of the communication system, as is the case with the synchronous demodulation of the suppressed-carrier double sideband amplitude modulation signal. It is further not required in the improved communication system that the carrier waves of the communication stations and the local carrier wave of the amplifier station are in phase or in phase opposition. This provides a greater freedom in the choice of the relation between the carrier frequency of the communication stations and that of the amplifier station.

What is claimed is:

1. A communication system comprising a plurality of communication stations and a relay station, said relay station comprising a source of carrier wave oscillations of first and second frequencies, said first and second frequencies having a constant predetermnied ratio not equal to unity, means for receiving signals from said communication stations, synchronous demodulator means for mixing said received signals with said first oscillations, means for modulating the output of said demodulator means on said second oscillations, and means for transmitting said modulated second oscillations, each of said communication stations comprising means for receiving said modulated second oscillations, means for deriving oscillations of said first frequency from said received modulated second oscillations, a source of signals, means for amplitude modulating said signals on said derived oscillations to produce suppressed carrier signals, and means for transmitting said suppressed carrier signals.

2. A communication system comprising a plurality of communication stations and a relay station, said relay station comprising a source of carrier wave oscillations of first and second frequencies, said first and second frequencies being unequal and having a predetermined constant ratio, loop conductor means, synchronous demodulator means, means applying said oscillations of said first frequency and signals received by said loop conductor means to said demodulator means for synchronously demodulating received signals, first amplitude modulator means, means applying the output of said demodulator means and said oscillations of said second frequency to said first modulated means, and means applying the output of said first modulator means to said loop conductor means, each of said communication stations comprising means for receiving modulated signals having a carrier wave of said second frequency, means for deriving an oscillation of said first frequency from said received modulated signals, a source of information signals, second amplitude modulator means, means applying said information signals and said derived oscillations to said second modulator means to produce a suppressed carrier signal, and means for transmitting said suppressed carrier signal.

3. The communication system of claim 2, wherein said first frequency is equal to an odd multiple greater than unity of half said second frequency.

4. The communication system of claim 2, wherein said suppressed carrier signals are double sideband signals, and said means applying signals received by said loop conductor to said synchronous demodulator means comprises single sideband filter means for removing one sideband from said double sideband signals received from said communication stations.

5. A communication system comprising a plurality of communication stations and a relay station, said relay station comprising oscillator means for producing oscillations of first and second frequencies that have a predetermined constant ratio $N/M$ not equal to unity, where N and M are predetermined integers, means for receiving signals modulated on a carrier of said first frequency, means connected to said receiving means and oscillator means for synchronously demodulating said received signals, means connected to said oscillator means and demodulating means for modulating the output of said demodulating means on oscillations of said second frequency, and means for transmitting the output of said modulating means with the carrier of said second frequency, said communication stations each comprising means for receiving signals modulated on oscillations of said second frequency, a receiving channel connected to said receiving means of the respective channel for demodulating the received signals to produce an output signal, a source of information signals, means connected to said receiving means of the respective station for multiplying received carrier oscillations of said second frequency by the ratio $N/M$ to produce oscillations of said first frequency, means for modulating said produced oscillations by said information signals to produce suppressed carrier signals, and means for transmitting said suppressed carrier signals.

6. The system of claim 5 wherein M equals 2 and N is an odd number greater than one.

References Cited

UNITED STATES PATENTS

| | | | |
|---|---|---|---|
| 2,064,896 | 12/1936 | Espenschied et al. | 325—10 X |
| 2,064,906 | 12/1936 | Green et al. | 343—175 X |
| 2,390,641 | 12/1945 | Chatterjea et al. | 343—179 X |
| 3,191,122 | 6/1965 | Hussey | 325—54 |

ROBERT L. GRIFFIN, *Primary Examiner.*

B. V. SAFOUREK, *Assistant Examiner.*

U.S. Cl. X.R.

325—49, 54; 343—175, 179